(12) United States Patent
Shigaki (10) Patent No.: US 7,245,822 B2
(45) Date of Patent: Jul. 17, 2007

(54) METHOD AND DEVICE FOR RECORDING/REPRODUCING BROADCASTING SIGNALS OF A PROGRAM

(75) Inventor: Satomi Shigaki, Tokyo (JP)

(73) Assignee: NEC Corporation, Tokyo (JP)

( * ) Notice: Subject to any disclaimer, the term of this patent is extended or adjusted under 35 U.S.C. 154(b) by 824 days.

(21) Appl. No.: 09/850,007

(22) Filed: May 8, 2001

(65) Prior Publication Data
US 2002/0057891 A1 May 16, 2002

(30) Foreign Application Priority Data
May 9, 2000 (JP) ............................. 2000-135530

(51) Int. Cl.
H04N 5/91 (2006.01)
(52) U.S. Cl. ...................................... 386/83
(58) Field of Classification Search ................. 386/33, 386/39, 45, 98, 125–126, 46, 52, 96, 97–106, 386/128, 1, 83; 707/205; 725/63; 369/47, 369/54, 60; H04N 5/76, 5/781
See application file for complete search history.

(56) References Cited

U.S. PATENT DOCUMENTS 5,276,830 A * 1/1994 Endo et al. ................. 707/205
6,498,893 B1 * 12/2002 Suenaga et al. .............. 386/46
6,901,208 B2 * 5/2005 Ando et al. .................. 386/95
2001/0003829 A1 * 6/2001 Romine ....................... 709/219
2002/0012530 A1 * 1/2002 Bruls ......................... 386/109

FOREIGN PATENT DOCUMENTS

JP 7-336253 12/1995
JP 11-75146 A 3/1999

OTHER PUBLICATIONS

News Trend from USA, "NIKKEI Pasokon", (DVR-Japanese Magazine) published Jan. 24, 2000, pp. 28.

* cited by examiner

Primary Examiner—Thai Q. Tran
Assistant Examiner—Mishawn Dunn
(74) Attorney, Agent, or Firm—Sughrue Mion, PLLC (57) ABSTRACT

A recording/reproducing manage unit 25, in response to an instruction, records the images of program into the recording files in order by changing the target recording file in a predetermined interval. Then the unit 25, in response to another instruction, reproduces the recording files in its recorded order. Thereby a recording/reproducing device of broadcasting signals of the invention can complete reproduction of a program at almost the same timing as an end time of real broadcasting of the program, even if the reproduction is started a long time behind the starting of the real broadcasting of the program.

13 Claims, 9 Drawing Sheets

METHOD AND DEVICE FOR RECORDING/REPRODUCING BROADCASTING SIGNALS OF A PROGRAM

BACKGROUND OF THE INVENTION

1. Field of the Invention

The invention relates to a method and a device for recording/reproducing digital broadcasting signals of a program and in particular, to a method and a device which can perform time-shift reproducing (delayed reproducing) of the program.

2. Description of the Related Art

An analog VTR (Video Tape Recorder) has been spread to record broadcasting signals of a program. When the VTR records broadcasting signals of the program, the VTR receives the broadcasting signals from a broadcasting station via an antenna, and transforms the received signals into predetermined form of signals for recording. And then, the VTR records the transformed signals on a magnetic tape using a magnetic head. Such the processes are well known in the public Also, after the VTR records broadcasting signals of a program in response to an instruction of a user, the VTR can again display the recorded signals of the program on a television set, by rewinding the tape and reproducing the signals of the program.

In such the VTR, it is impossible to record image data and sound data of the program to a magnetic tape and reproduce the data from the magnetic tape, simultaneously. For example, the VTR can not record a program which starts at 8:00 p.m. and ends at 10:00 p.m. while reproduction of the program is started at 9:00 p.m. from the beginning of the program. Furthermore, the VTR can not receive and record a program while performing special reproduction such as fast-forward reproduction of the recorded signals of the program.

In this regard, a conventional delay reproducing apparatus is disclosed in Japanese Laid Open Publication No. H07-336253(namely, 336253/1995). The conventional delay reproducing apparatus stores signals of a program to a RAM (random access memory) or a magnetic tape to pretend that broadcasting of the program is paused for a predetermined duration. Thus, in the apparatus, when a user starts watching a program, which is broadcast from 8:00 p.m. to 10:00 p.m., at 9:00 p.m. from the beginning of the program, the recording of the program is started at 8:00 p.m. and the reproducing of the recorded signals of the program is started at 9:00 p.m. The reproducing of the recorded signals of the program can be started at a timing an hour later than a timing when broadcasting of the program is actually started by continuing the recording of signals of the program to the RAM or an endless tape.

However, in the conventional apparatus, although data of a program can be reproduced at a timing delayed by a predetermined duration from an actual broadcasting time of the program, the delayed duration is limited to a very short time due to a small capacity of the RAM or the endless magnetic tape.

Also, recently, a DVR (Digital Video Recorder) has been known which can record data of a TV program (contents) to a HDD (hard disk drive). The DVR can "rewind" and reproduce a missed signals (image data or sound data) which are broadcast in several seconds before, while data of a program being recorded. This function is referred to as "time-shift reproduction".

The DVR is, for example, disclosed in a Japanese magazine "NIKKEI Pasokon" published in Jan. 24, 2000, page 28.

But, the DVR disclosed in the above magazine can not complete reproduction of a program at almost the same timing as an end time of real broadcasting of the program, even if the reproduction is started a long time behind the starting of the real broadcasting of the program.

Also, the magazine does not disclose a method of preventing a file from destruction when a power of the DVR is suddenly shut down during the DVR records signals of the program and a method of recording a full-length program to a small amount of storage medium. Therefore, the magazine does not disclose a specific effective configuration of the DVR at all.

SUMMARY OF THE INVENTION

It is, therefore, an object of the invention to provide a method and a device, for recording/reproducing digital broadcasting signals of a program, which is capable of performing time-shift reproduction (delayed reproduction).

The time-shift reproduction starts reproduction of a program a predetermined time behind a start time of actual broadcasting of the program, by receiving digital broadcasting data of the program, recording the data to a storage device such as a hard disk drive, and dividing the recorded data into a plurality of files in order of time.

It is also an object of the invention to a method and a device, for recording/reproducing digital broadcasting signals of a program, which can perform the time-shift reproduction of a program, with easy and simple operation.

According to a first aspect of the invention, there is provided a method of recording/reproducing broadcasting signals. The method comprises the steps of establishing a size of recording files based on a broadcasting time of a program to be recorded and capacity of a storage device in which the recording files are included, receiving signals of the program on a channel, and consecutively recording the signals into the recording files in order, and controlling to continue the recording step until a recording stop instruction is received or broadcasting of the program is ended.

Thereby, broadcasting signals of a program are divided and recorded into a plurality of files in a time series, therefore, reproduction is performed using a file different from another file in which a part of the signals are currently recorded. As a result, time-shift reproduction can be performed.

Also, since the broadcasting signals are recorded in relatively small volume of files one after another, even if a power of a device performing the recording operation is suddenly shut down, already recorded files are properly kept and for the files, it is possible to reproduce.

Further, since the broadcasting signals are, as set forth, recorded into a plurality of files, in reproducing the files, a specific file can be skipped as required. And a size of the files can be optionally selectable.

According to a second aspect of the invention, there is provided a method of the first aspect further comprising the step of reproducing the recording files in order of recording, in response to a reproduction instruction.

According to a third aspect of the invention, there is provided a method of the first aspect, wherein the recording step comprises the steps of determining whether or not a volume of a part of the signals which have been recorded into a first recording file reaches the size established in the establishing step, closing the first recording file and recording the remaining part of the signals to a second recording file when the determining step determines that the volume is equal to the size, and repeating the determining step and the closing/recording step to obtain the recording files in which the signals are recorded in order.

According to a fourth aspect of the invention, there is provided a recording/reproducing device of broadcasting signals. The device comprises a receive unit which receives broadcasting signals of a program on a channel, a manage unit which picks up program information from the received signals of program and analyses the program information, a storage device which stores recording files, a decoder unit which decodes the received signals of program to obtain image data and sound data, a recording/reproducing manage unit which produces and reproduces recording files, and a data control unit which supplies the received signals of program to the decoder unit under control of the manage unit, and supplies the received signals of program to the recording/reproducing manage unit to record the signals into the recording files each of which has a predetermined size in order until a recording stop instruction is received or broadcasting of the program is ended, and reproduces and supplies the recording files thus produced in the recording/reproducing manage unit to the decoder unit in response to a reproduction instruction.

According to a fifth aspect of the invention, there is provided a recording/reproducing device of broadcasting signals. The device comprises a storage device which includes recording files to record broadcasting signals of a program on a channel, an establishing unit which establishes a size of the recording files based on a broadcasting time of the program to be recorded and capacity of the storage device, a receive unit which receives signals of the program and consecutively records the signals into the recording files in order, and a recording control unit which controls the receive unit to repeat the reception and the recording until a recording stop instruction is received or broadcasting of the program is ended.

DESCRIPTION OF THE PREFERRED EMBODIMENT

Figure 1:
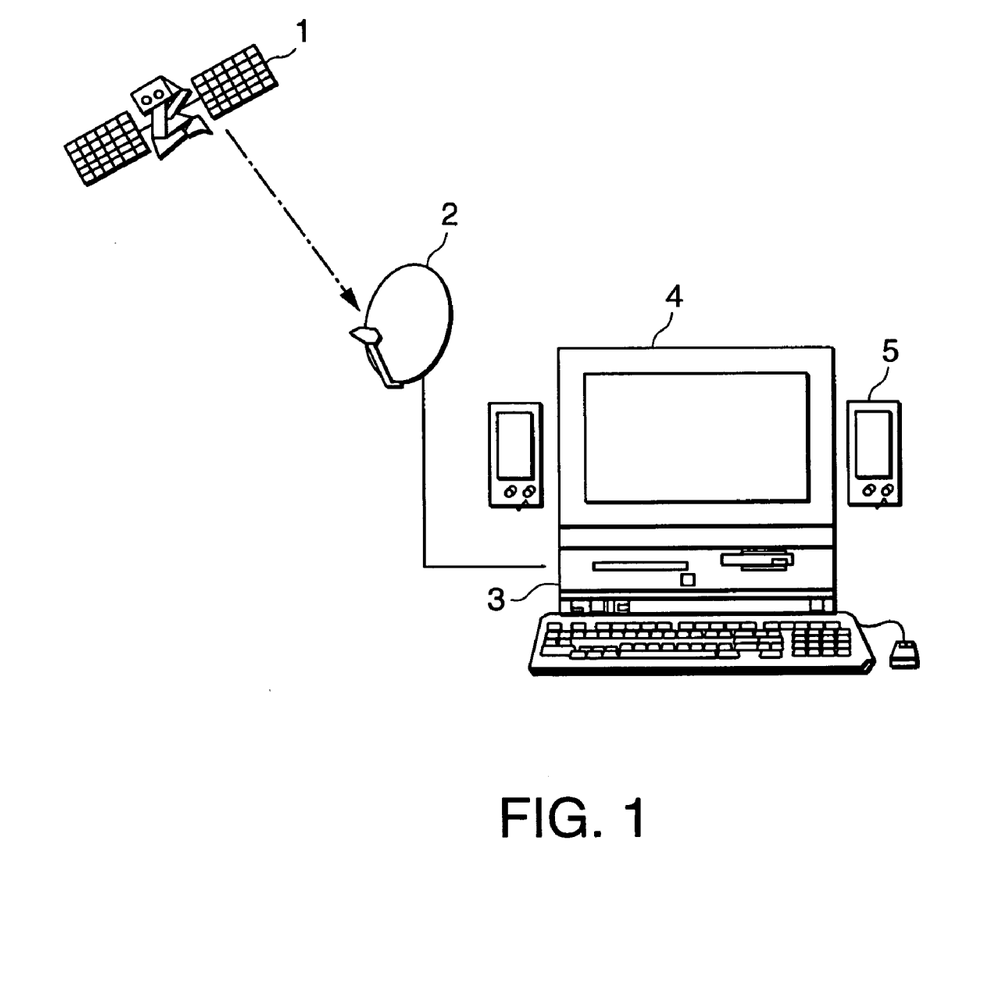
FIG. 1 shows a diagram of an example of a digital satellite broadcasting system to which a method and a device of the invention can be applied.

At first, description is made about an embodiment of the invention with reference to FIG. 1. Digital satellite broadcasting treated by a digital satellite broadcasting system shown in FIG. 1 is standardized as ISO 13818-1 and in the broadcasting, MPEG 2 transport stream (hereinafter, abbreviated to "TS") is used which defines a packet including 188 bytes.

In the digital satellite broadcasting system, a parabolic antenna 2 receives a radio wave sent from a broadcasting station (not shown) via an artificial satellite 1, and then the received digital broadcasting signals are sent to a receiving board 6 (shown in FIG. 2) incorporated in a personal computer 3 (hereinafter, abbreviated to "PC").

The digital broadcasting signals are then processed in the PC 3 to generate broadcasting images and a broadcasting sound. The images are displayed on a cathode ray tube (CRT) 4 and the sound is output from a loudspeaker 5.

Figure 2:
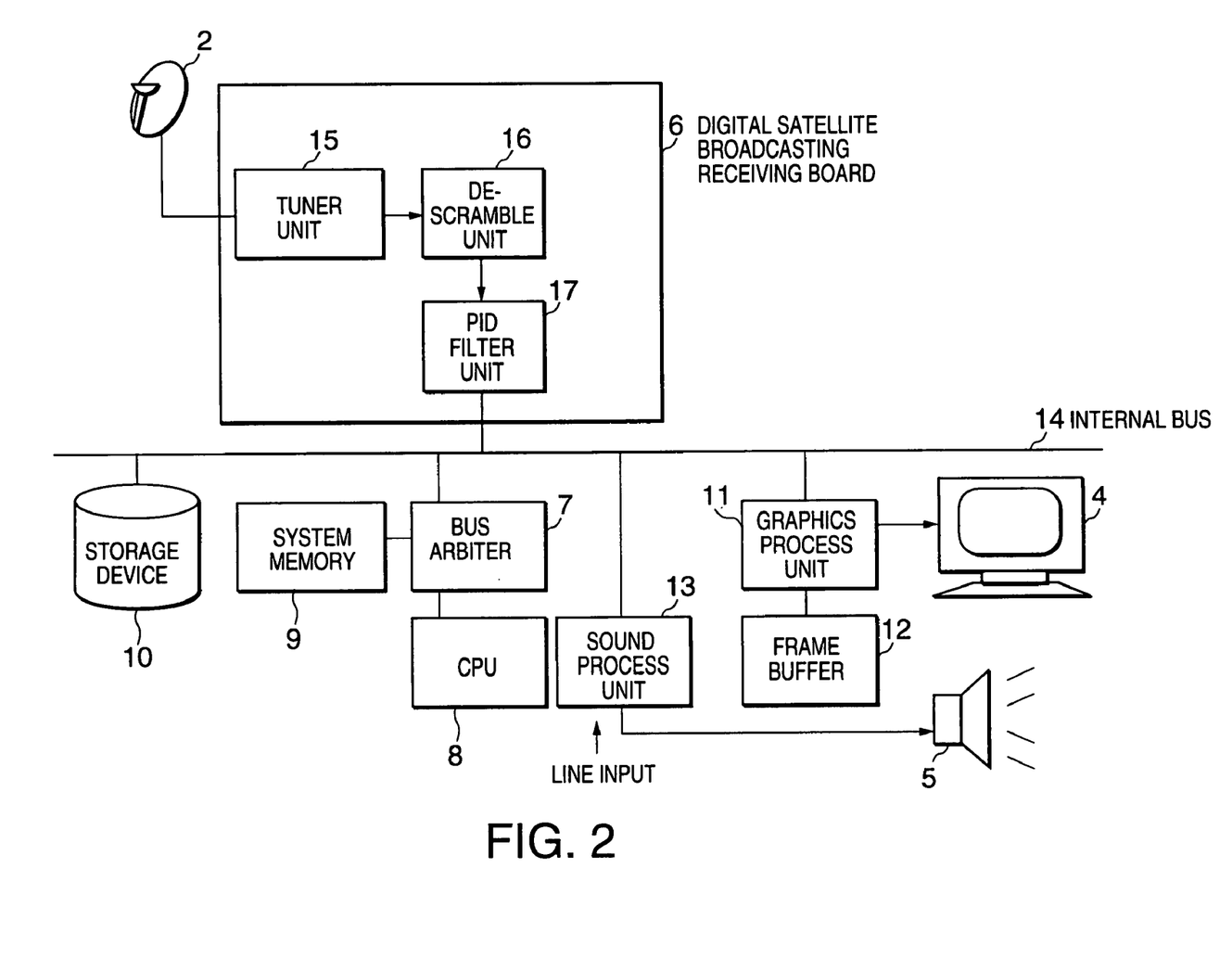
FIG. 2 shows a block diagram of an embodiment of the invention.

Next, description is made about process according to an embodiment of the invention with reference to FIG. 2. The digital satellite broadcasting wave sent from the artificial satellite 1 shown in FIG. 1 is received by a parabolic antenna 2 shown in FIG. 2. The parabolic antenna 2 is connected to a tuner unit 15 of a digital satellite broadcasting receiving board 6 incorporated in a PC 3.

The tuner unit 15 performs decoding and error correction of the digital satellite broadcasting wave received by the parabolic antenna 2 and picks up the TS data. The TS data includes an ID for identifying and managing packet information for each packet. The ID included in each packet is referred to as "PID".

The TS data sent from the tuner unit 15 are entered into a descramble unit 16 which decrypts the TS data when the TS data are encrypted or scrambled, for example, to supply a pay program.

The de-scrambled TS data are then sent to a PID filter unit 17. The PID filter unit 17 picks up the PID of packet in the TS data and when it is determined that the PID is coincident with one of designated PIDs, sends the PID to a internal bus 14.

The digital satellite broadcasting receiving board 6 is connected to the internal bus 14 of the PC 3 and controlled by a CPU 8 of the PC 3. In addition, a storage device 10, a bus arbiter 7, a graphics process unit 11, and a sound process unit are connected to the internal bus 2. The bus arbiter 7 arbitrates and manages access demands from the CPU 8 to a system memory 9, access demands to various devices connected to the internal bus 14, and demands of use of the internal bus 14 from each device connected to the internal bus 14.

The system memory 9 and CPU 8 are connected to the bus arbiter 7. A frame buffer 12 and a CRT 14 are connected to the graphics process unit 11. The CPU 8 controls the digital satellite broadcasting receiving board 6, controls input/output of data to/from the storage device 10, and controls transmission of displaying data to the graphics process unit 11. The system memory 9 stores a program and data, which is read and executed by the CPU 8, for controlling the whole functions of PC 3. The graphics 11 displays data on the CRT 4 by controlling the frame buffer 12.

The sound process unit 13 performs A/D conversion of sound signals from the outside and transfers the converted sound signals to the system memory 9. Also, the sound process unit 13 performs D/A conversion of sound data stored in the system memory 9 and outputs the sound data from the loudspeaker 5.

Figure 3:
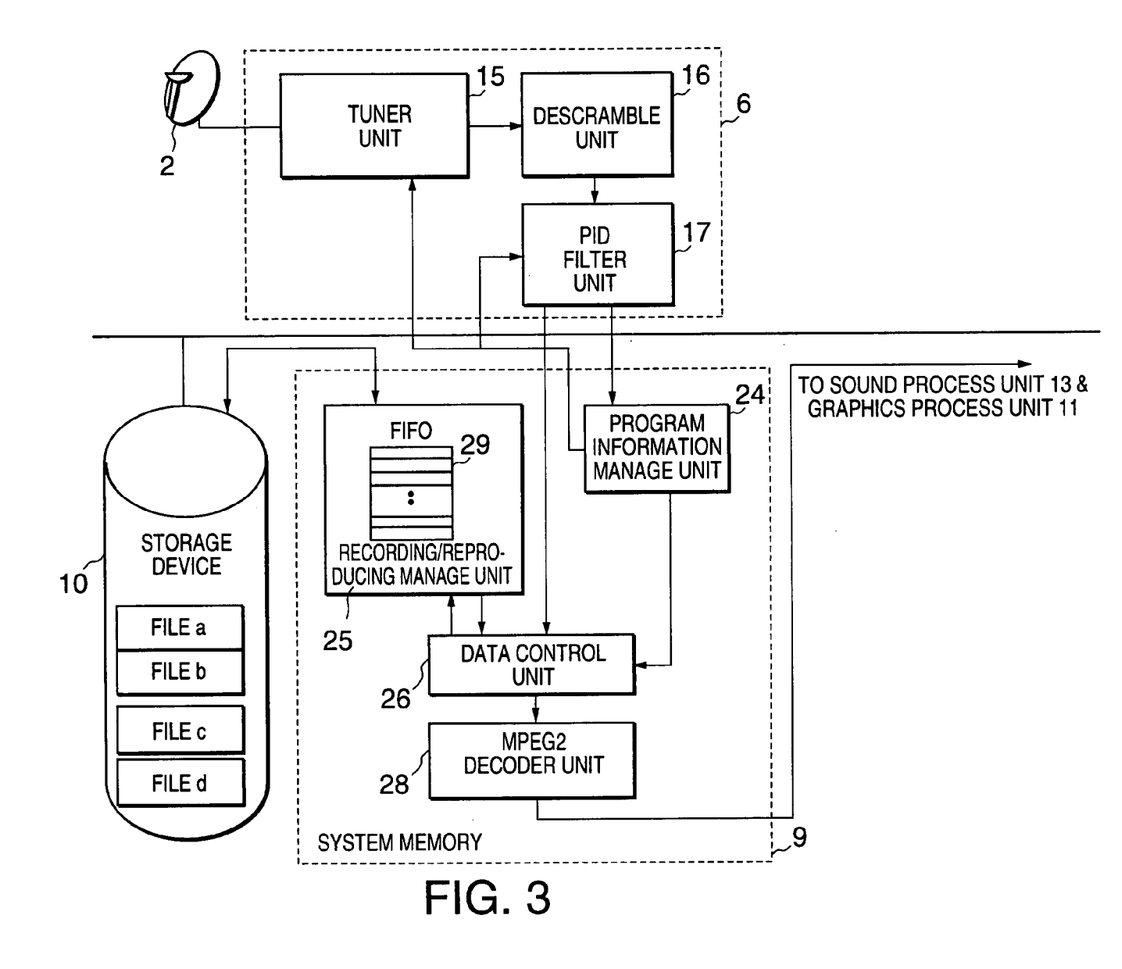
FIG. 3 shows a diagram for describing data flow of an embodiment of the invention.

Next, description is made about function of a program stored in the system memory 9 with reference to FIG. 3. According to the program in the system memory 9, a program information manage unit 24 receives program information from the digital satellite broadcasting receiving board 6, and then the program information is analyzed to generate a program table for user convenience. The program information manage unit 24 also manages information for recording a program.

Further, the program information manage unit 24 informs a data control unit 26 of a user instruction when the user instructs recording, real-time reproduction of recorded program, or time shift reproduction of recorded program.

The data control unit 26 transfers the TS data received from the digital satellite broadcasting receiving board 6 to an MPEG 2 decoder unit 28 based on a control instruction of the program information manage unit 24. Further, the data control unit 26 transfers the TS data to a recording/reproducing manage unit 25 or instructs the recording/reproducing manage unit 25 to read recorded data based on a recording/reproducing instruction from a user. The recording/reproducing manage unit 25 stores the TS data sent from the data control unit 26 to an FIFO 29 (that is, data buffering).

The recording/reproducing manage unit 25 stores the TS data stored in the FIFO 29 into the storage device 10 or reads recorded data from the storage device 10 based on an instruction from the data control unit 26. The recording/reproducing manage unit 25 produces a predetermined size of record files when the TS data are stored. The MPEG 2 decoder unit 28 decodes the received TS data, and transfers image signals in the decoded data to the graphics process unit 11 and transfers sound signals in the decoded data to the sound process unit 13. As described above, recording and reproducing of digital data are performed.

Next, operations of an embodiment of the invention is described referring to FIGS. 1 to 3. At first, in receiving digital broadcasting, a user selects a favorite channel. When the user select the channel, the program information manage unit 24 obtains a frequency of a wave corresponding to a program of the selected channel, and under control of the CPU 8, establishes the frequency to the tuner unit 15 via bus arbiter 7, as a receiving frequency. Then, the program information manage unit 24 establishes a PID which is required to receive a program and a PID which is required to receive program information to the PID filter unit 17, and receives compressed data including image data and sound data or the program information.

The program information manage unit 24 manages the program information, analyzes whether the program which is selected by the user can be recorded, interprets information including the program information, and produces data to be sent to the user. When the program is not permitted to be recorded, the unit 24 controls so that the user can not instruct to record the program. Thereby, only TS data of programs which are permitted to be recorded can be recorded.

The TS data of the selected program picked up by the PID filter unit 17 are sent to the data control unit 26 in the system memory 9. The data control unit 26 transmits the TS data to the MPEG 2 decoder unit 28 to reproduce the program. The program information manage unit 24 informs the data control unit 26 of an instruction of the user when the user instructs recording, real-time reproducing, or time shift reproducing.

The data control unit 26 provides the TS data from the PID filter unit 17 to the MPEG decoder unit 28 and the recording/reproducing manage unit 25 when the unit 17 receives a reproducing (real-time reproduction) instruction and recording instruction from the program information manage unit 24. The recording/reproducing manage unit 25 controls to produce recording files in a predetermined interval in response to the recording instruction. Also, the recording/reproducing manage unit 25 successively reproduces the recording files in order that the recording files are produced, when the recording files are reproduced.

When the time shift reproducing is received from the program information manage unit 24, the data control 26 supplies the TS data currently received to the recording/reproducing manage unit 25, reads recording files which has been already recorded and are designated by the user from the storage device 10, and sends the recording files (TS data) to the MPEG 2 decoder unit 28. As a result, TS data included in the recording files are reproduced.

Figures 4A, 4B, 4C:
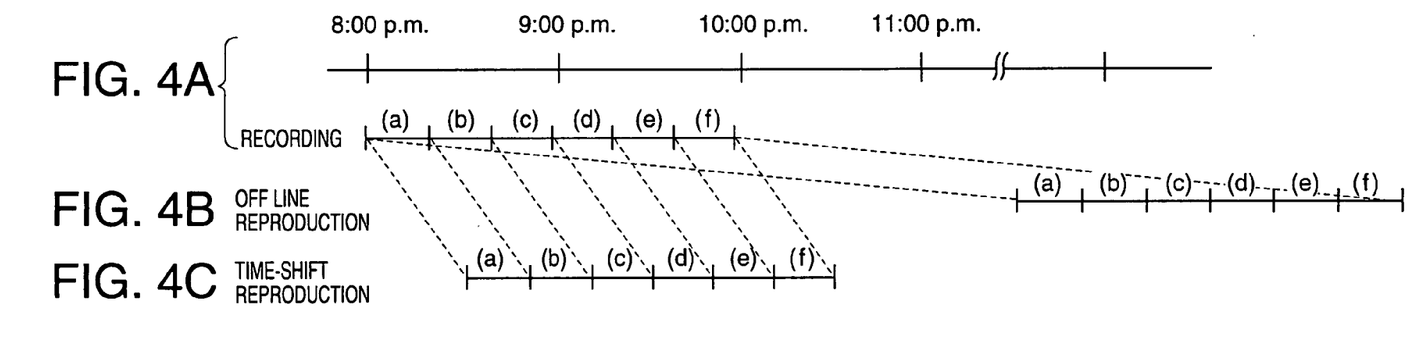
FIGS. 4A-4C show diagrams conceptually representing reproduction of a program according to an embodiment of the invention.

Next, description is made about a method of producing TS data of the recording file referring to FIGS. 4A to 4C. As shown in FIGS. 4A to 4C, when a program which starts at 8:00 p.m. and ends at 10:00 p.m. is recorded, at first, TS data which are received from 8:00 p.m. to 8:20 p.m. are stored in the storage device to produce a first recording file (a). Then, TS data which are received from 8:20 p.m. to 8:40 p.m. are stored in the storage device to produce a second recording file (b).

In a similar manner, a third recording file (c), a fourth recording file (d), a fifth recording file (e), and a sixth recording file (f) are successively produced and stored in the storage device 10. Therefore, each of the above recording files includes broadcasting data of twenty minutes. Thus, when a program continuing for two hours is recorded, six recording files (a to f) are produced each of which includes TS data corresponding to twenty minutes of broadcasting data.

The recording/reproducing manage unit 25 can records TS data to a file without discarding the TS data since the unit 25 includes the FIFO 29 as shown in FIG. 3. The recording/reproducing manage unit 25 also stores, to the storage device 10, the program information and other information such as information representing the reproducing order in addition to the TS data, when recording process is performed.

Next, reproducing process is described with reference to FIGS. 4A to 4C. When a user instructs to reproduce, the data control unit 26 instructs the recording/reproducing manage unit 25 to read recording data which are designated to reproduce by the user. The recording/reproducing manage unit 25 searches data files to be reproduced referring to program information (for management) stored in the storage device 10 and information representing the reproducing order (a→b→c→d→e→f), and successively reproduces the searched data files in the reproducing order. After that, the recording/reproducing manage unit 25 transfers TS data of the searched data files to the data control unit 26.

The MPEG 2 decoder unit 28 receives the TS data from the data control unit 26 and decodes the TS data to produce decoded image data and decoded sound data. The decoded image data are displayed on the CRT 4 via the graphics process unit 11. On the other hand, the decoded sound data are output from the loudspeaker 5 via the sound process unit 13. Thereby, the recording files are reproduced.

When a program is recorded from 8:00 p.m. to 10:00 p.m. as shown in FIG. 4A, in Off-line reproduction, the recorded program is reproduced after 10:00 p.m. as shown in FIG. 4B. Also, in the Off-line reproduction, a first recording file (a), a second recording file (b), a third recording file (c), a fourth recording file (d), a fifth recording file (e), and a sixth recording file (flare reproduced one after another in the above listed order.

Next, description is made about operation of time-shift reproduction (delay reproduction) as shown in FIG. 4C. It is assumed that a user requires to watch a TV program which is broadcast from 8:00 p.m. to 10:00 p.m. but, the user can watch the TV program only after 8:30 p.m. due to some reason.

In this case, in the embodiment of the invention, while the program broadcast from 8:00 p.m. to 10:00 p.m. being recorded (shown in FIG. 4A), reproduction of the recorded program is started from the beginning of the program at 8:30 p.m. (shown in FIG. 4C).

Thereby, the user can start watching the desired TV program from the beginning of the program at 8:30 p.m. Therefore, the user finishes watching the program at 10:30 p.m. Such the reproduction is referred to as time-shift reproduction.

Figure 8:
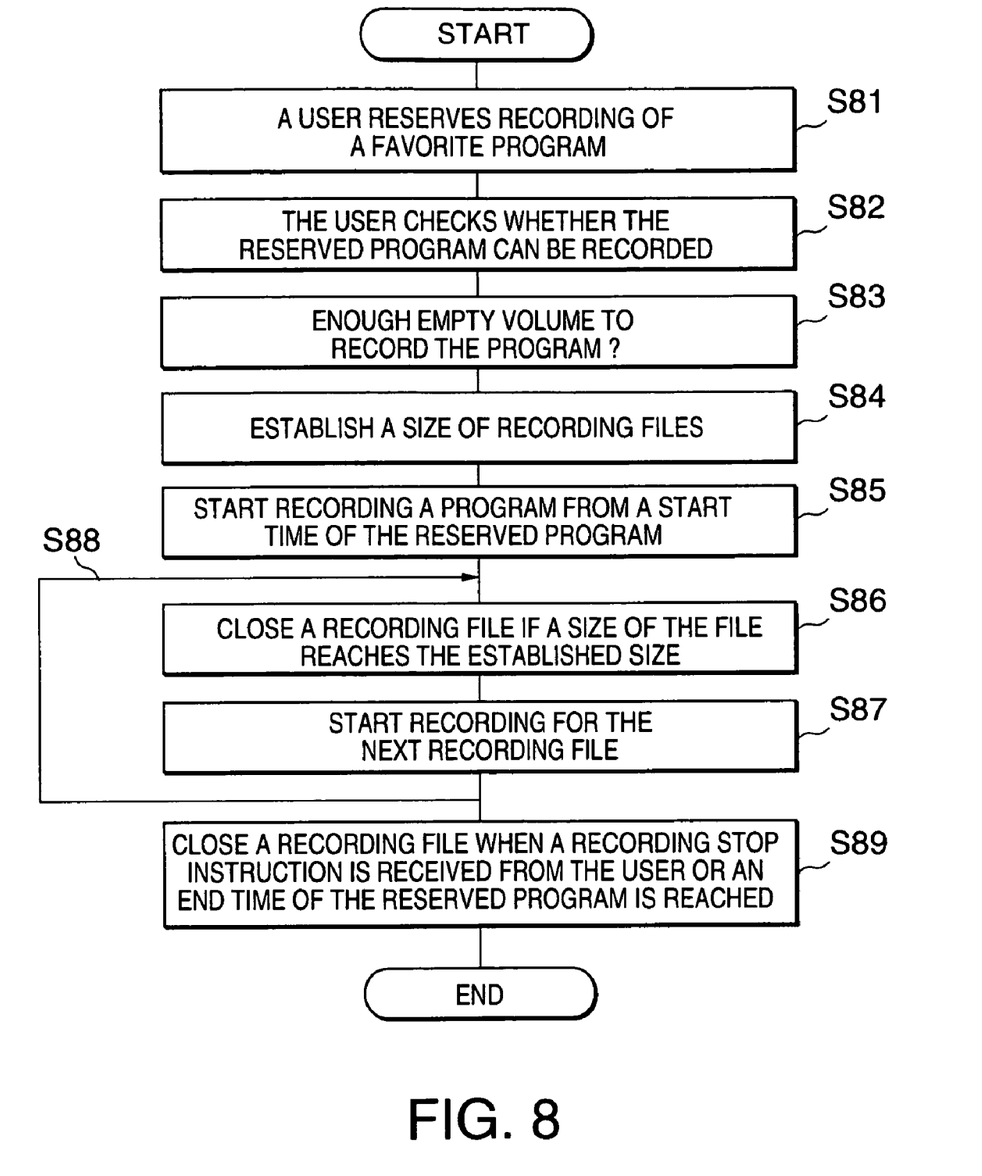
FIG. 8 shows a flowchart of recording operation according to an embodiment of the invention.

Then, recording operation is explained with reference to a flowchart in FIG. 8. In step S81, a user reserves recording of a TV program by designating a channel of the TV program, a start time of the recording, and an end time of the recording in advance with reference to a TV program table such as an EPG (Electric Program Guide), which is provided through signals from a broadcasting station in Japan. Then, in step S82, the user checks whether the designated program can be recorded or not since there may be programs which are prohibited from recording. Only programs which are not prohibited from recording can be recorded.

Next, it is checked whether or not the storage device 10 has enough empty volume to record the designated duration of the program (step S83). In digital satellite broadcasting, a volume of the storage device 10 required to record a program lasting two hours is about 3.6 gigabytes since 4 megabytes per second of data are sent in average although an amount of the sent data may be changed according to a program.

Further, a file size which is suit for the recording is established based on information such as the recording times designated by the user and the empty volume of the storage device 10 (step S84).

For example, it is assumed that the user reserves recording of a program which is broadcast though a channel 210 from 8:00 p.m. to 10:00 p.m. Herein, the program information manage unit 24 sets a receiving frequency corresponding to the channel 210, to the tuner unit 15. Then, the unit 24 sets a PID required to receive signals of the channel 210 or another PID to obtain information, such as a program information, which is required to receive the program, to the PID filter unit 17. As a result, compressed data (TS data) including images and sound of the channel 210 and the program information are received.

The data control unit 26 sends the received TS data to the recording/reproducing manage unit 25. The unit 25 then starts producing recording files each of which has the file size designated in step S84, using the TS data (step S85).

If the size of a file in which TS data are currently stored reaches the file size designated in step S84, the file is closed (step S86) and the rest of the TS data are next stored in a newly created file (step S87).

Until the user instructs to stop the recording or it is the end time of the program designated, operations in steps S86 and S87 are repeated (step S88). If the user instructs to stop the recording or it is the end time of the program, the file in which the TS data are currently stored is closed (step S89).

Figure 9:
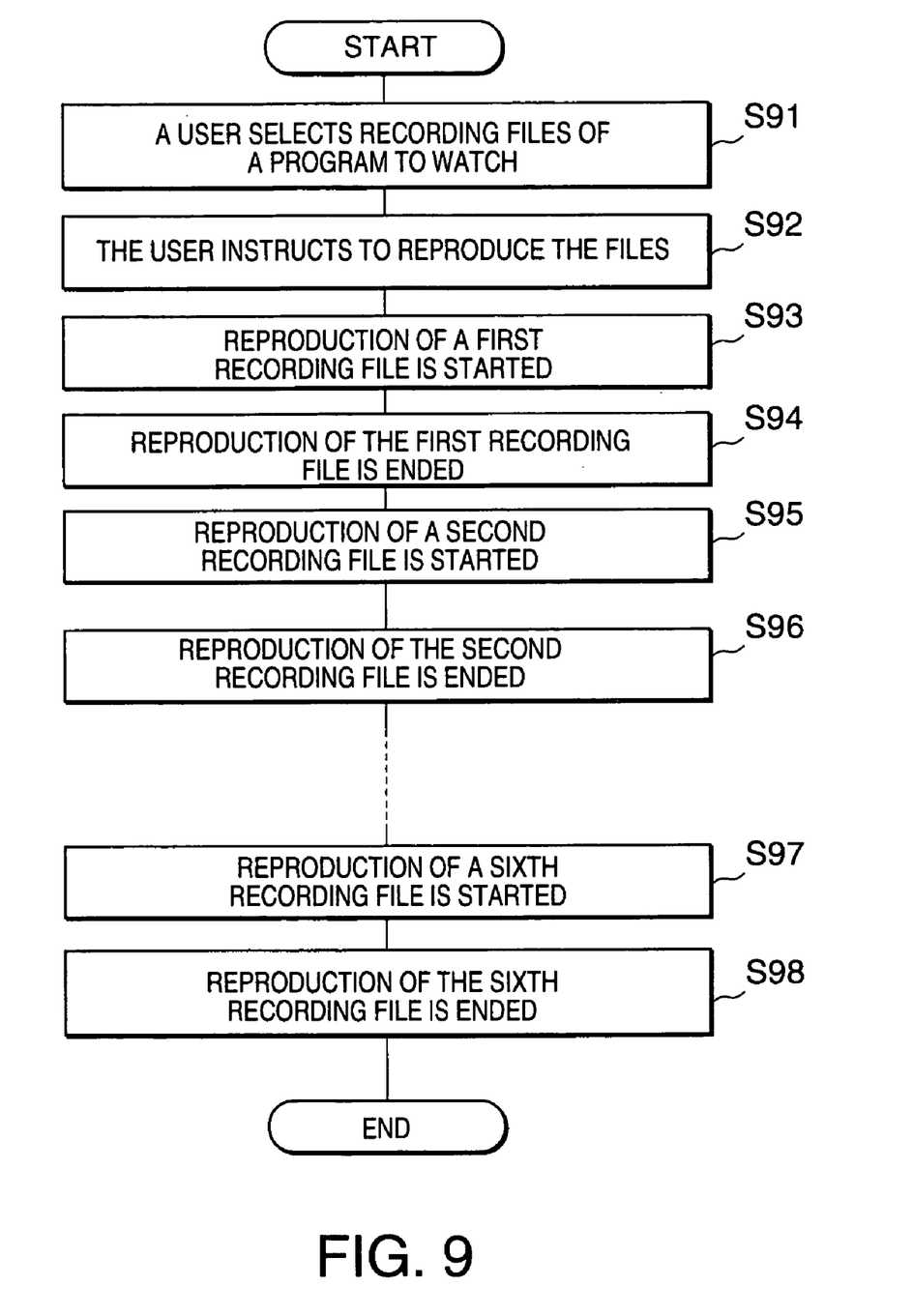
FIG. 9 shows a flowchart of general reproduction operation according to an embodiment of the invention.

Then, description is made about operations of the off-line reproduction with reference to FIG. 9.

It is assumed that a program is recorded from 8:00 p.m. to 10:00 p.m. and the recorded data are stored into six recording files (a, b, c, d, e, and f) each of which includes twenty minutes of the recorded data. Herein, it is also assumed that the user selects recording files of a program to watch its contents (step S91).

When the user instructs to reproduce the recording files (step S92), at first, a first recording file which stores the first part of the program is searched and reproduced (step S93).

When the reproducing of the first recording file is completed, the first recording file is closed (step S94). And simultaneously with the closure of the first recording file, the second recording file is reproduced (step S95). Then, when the reproducing of the second recording file is completed, the second recording file is closed (step S96). Hereinafter, in similar manner, the third recording file through the sixth recording file are processed (step S97, S98).

Figure 5A:
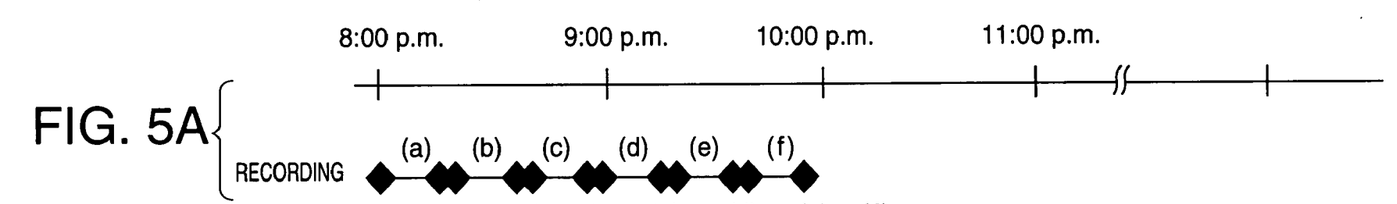
FIGS. 5A-5C show diagrams representing timings of recording, reproduction, and deletion.
Figure 5B:
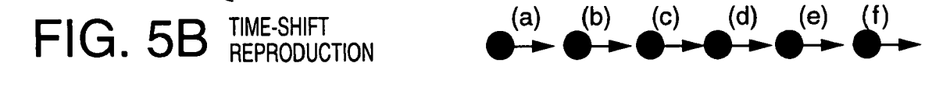
Figure 5C:
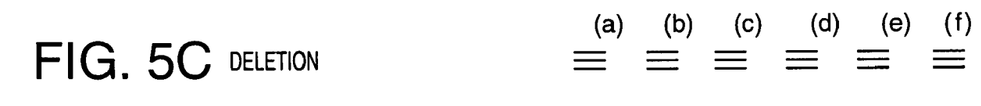

Next, description is made about operations of time-shift reproduction with reference to FIGS. 5A to 5C.

For example, when a program is recorded from 8:00 p.m. to 10:00 p.m. into six recording files (a, b, c, d, e, and f) each of which has twenty minutes of recorded data, and when the user instructs to start reproducing the program from the beginning of the program at 8:30 p.m., a first recording file (a) is reproduced although recording into a second recording file (b) is performed in the time point as shown FIGS. 5A and 5B.

The recording into the second recording file (b) is completed at 8:40 p.m. and next, a third recording file (c) is created.

At 8:50 p.m., the reproducing of the first recording file (a) is completed and the recording into the third recording file (c) is performed, and next, the second recording file (b) is reproduced.

In a similar manner, while a fourth recording file (d), a fifth recording file (e), and a sixth recording file (f) are created at the corresponding timing shown in FIG. 5A, the third recording file (c), the fourth recording file (d), the fifth recording file (e), and the sixth recording file (f) are reproduced at the corresponding timing shown in FIG. 5B.

As described above, by the creation of the recording files and the reproduction of the recording files, it is possible to start watching the program which is broadcast from 8:00 p.m., at 8:30 p.m. Furthermore, if the user does not want to keep the recorded program, the recording file can be deleted after the file has been reproduced (that is, when the next recording file is reproduced) as shown in FIG. 5C.

Also, total volume of the storage device 10 required to store the recording files can be reduced by deleting the recording file after the reproduction of the recording file is completed. Deletion timing of each recording file is shown in FIG. 5C.

Next, description is made about another embodiment of the invention with reference to FIGS. 6A to 6D.

In this embodiment, simultaneously with the above mentioned time-shift reproduction, fast-forward reproduction is performed.

Figure 6A:
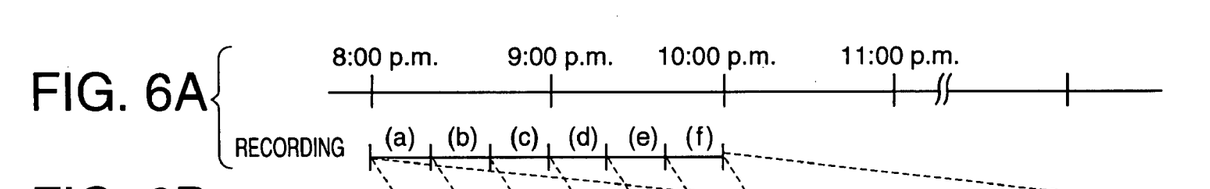
FIGS. 6A-6D show diagrams conceptually representing reproduction of a program according to an embodiment of the invention.
Figures 6B, 6C:
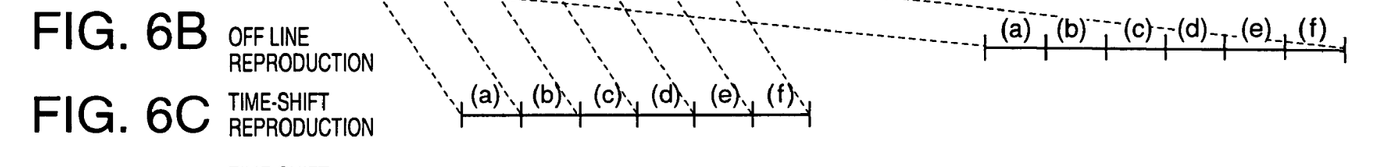
Figure 6D:
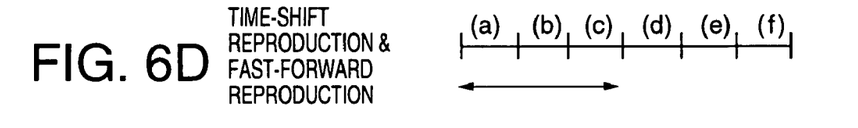

The fast-forward reproduction can be performed by a program control for the recorded part of a program (FIG. 6D).

As described above, in the same manner as the storing of a program information and information on the reproduction order of the recording files in creating the recording file, a time when creation of the recording is started and a time when the creation of the recording is completed are stored as header information of the recording file.

After that, it is determined whether or not a time when a user instructs to reproduce a recording file (the current time) is later than a time when recording to the recording file which is designated by the user was completed, by referring to the header information of the recording file in the reproducing timing of the recording file. If the current time is later than the time when the recording of the recording file is completed, time-shift reproduction of the recording file can be performed.

In a similar manner to the above mentioned embodiment, it is assumed that a program lasting from 8:00 p.m. to 10:00 p.m. is consecutively recorded into a plurality of recording files each of which can record twenty minutes of contents of the program (FIG. 6A). Herein, if a user instructs to reproduce the program at 8:30 p.m. (the program being recorded in the time point), reproduction of a first recording file (a) is immediately started since recording of the first recording file (a) is completed. Also, in this time point, fast-forward reproduction of the first recording file (a) can be performed.

Similarly to the above operations for the first recording file (a), if recording of a second recording file (b) is completed, time-shift reproduction of the second recording file (b) can be performed and simultaneously, fast-forward reproduction of the second recording file (b) can also performed. The same explanation also fits for a third recording file (c). Therefore, as shown in FIG. 6D, if the time-shift reproduction of the first recording file (a), the second recording file (b), and the third recording file (C) is performed and the fast-forward reproduction of them is performed simultaneously, recording of a fourth recording file (d) is completed at 9:20 p.m. and reproduction of the fourth recording file (d) is started at the same time.

However, in this situation, if the fast-forward reproduction is performed about the fourth recording file (d), the fast-forward reproduction is ended before recording of a fifth recording file (e) is completed. Therefore, there is no recording file to be reproduced immediately after the reproduction of the fourth recording file (d) is completed. As a result, consecutive reproduction of the program can not be done.

Then, in the second embodiment of the invention, the fast-forward reproduction of the fourth recording file (d) is controlled not to be performed by a software program. For the same reason, fast-forward reproduction of a fifth recording file (e) and a sixth recording file (f) is not performed.

Therefor, as shown in FIG. 6D, the fast-forward reproduction is not performed about recording files after the third recording file (c) and normal reproduction is performed about them instead of the fast-forward reproduction.

Also, when each of the recording files is created to include twenty minutes of contents, there is at least a twenty minutes delay time between broadcasting data received in real-time and broadcasting data reproduced by a combination of time-shift reproduction and fast-forward reproduction. To compress the delay time, the recording files must be created to have less capacity.

For example, if each of the recording files is created to include a minute of contents, reproduction of all recording files is completed at a few minutes past 10:00 p.m., when broadcasting of the program is completed in actual, by performing the time-shift reproduction and the fast-forward reproduction.

Figure 7A:
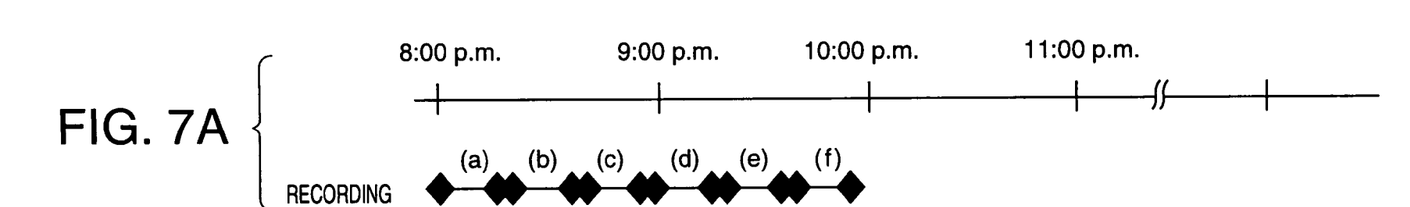
FIGS. 7A-7C show diagrams representing timings of recording, reproduction, and deletion.
Figure 7B:
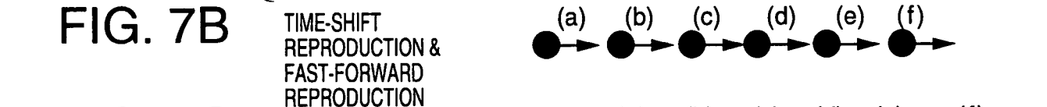
Figure 7C:
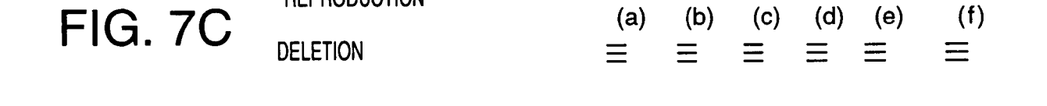

Also in the second embodiment of the invention, each of the recording files can be deleted from the storage device 10 if the recording files are not required to store. Timing of the recording to the recording files, the time-shift reproduction and the fast-forward reproduction, and the deletion are shown in FIGS. 7A to 7C.

In the second embodiment of the invention, information representing order to reproduce recording files is stored into the recording files, but the recording files can be reproduced in the required order by naming file names of the recording files based on a predetermined rule.

For example, if a file name of a recording file may be named based on the rule "name of the program plus the order of creation of the file", a TV program "2 hours TV show" which is lasting from 8:00 p.m. to 10:00 p.m. is recorded into a plurality of files "2 hours TV show 1", "2 hours TV show 2", "2 hours TV show 3", . . . . When the recording files are reproduced, the files are reproduced in a proper order (the order of being recorded) by referring to the file names of the recording files.

Alternatively, the recording files are also reproduced in a proper order by storing an address pointing a recording file to be reproduced next into a current recording file.

Also, when TS data which are used in digital satellite broadcasting are reproduced, at first, sequence header including image format information such as an image size and an image frame rate is searched, and then data resides next to the sequence header are reproduced based on the image format information. Therefore, when the recording file is created, the image format information is stored at the beginning part of the recording file, and the TS data are stored in the rest of the recording file. When the recording file is reproduced, the reproduction is performed smoothly since the sequence header, which includes image format information to be required to reproduce the TS data, resides in the beginning of the recording file.

According to a third embodiment of the invention, two tuner units are prepared each of which is configured as the tuner unit 15 described in connection with FIGS. 2 and 3. By using two tuner units, it is possible to individually designate a first program corresponding to a channel which is currently watched by a user and a second program corresponding to another channel. Therefore, when the second program which the user desires to watch is started while watching the first program, the second program is recorded, and then reproduced from the beginning of the program after broadcasting of the first program is completed.

That is, it is possible to record a program broadcast in the same time slot on a different channel.

Also, digital data of a TV program may be illegally copied when the digital data are transferred via a bus. Therefore, it is required that the digital data are encrypted (scrambled) in some method.

When whole digital data are scrambled for each bit, if an error occurs in a storage device such as a hard disk drive which stores the scrambled digital data, the digital data can not be decrypted (descrambled) due to lack of required bits.

Thus, to overcome the problem, the digital data of a program is recorded into a plurality of recording files and each of the recording files has a different key which is used to de-scramble the corresponding recording file. Thereby, even if an error occurs on the storage device including the scrambled recording files, the recording files other than the file which can not be accessed due to the error are still accessible.

Further, the method of the invention also applies to a digital ground wave broadcasting system or a digital CATV broadcasting system by changing the tuner unit 15 into a digital ground wave tuner unit or a digital CATV tuner unit.

Still further, a range to which the method of the invention is applied is not limited to a digital broadcasting program. Therefore, the method of the invention can be applied to analog broadcasting by performing A/D conversion on the received analog signals and MPEG 2 encoding on the digital converted signals.

Also, the method of the invention is used for all sorts of stream data in addition to the above mentioned TS data.

Further, in the above embodiments of the invention, reproduction instruction of a program is made after at least one first recording file is closed with full contents, but the method of the invention is not limited to such the timing, For example, reproduction of the first recording file (a) can be performed while recording operation to the first recording file (a) being performed.

In this case, when reproduction of the first recording file (a) is instructed, the first recording file (a) under the recording operation is closed, and then the recording operation is performed about a newly crated recording file (a second recording file).

As described above, it is a first effect of the invention to perform time-shift reproduction which reproduces a recording file in which signals corresponding to a part of a program have already stored, while recording of signals of the other part of the program are recorded into another recording file.

The time-shift reproduction can be performed by recording a TV program into a plurality of recording files in order when stream data used for digital broadcasting are recorded into a storage device such as a hard disk drive, and by controlling, when a recording file is used to record the program, to reproduce another recording file different from the recording file used to record.

Also, by the time-shift reproduction, a user can watch the program using the plurality of recording files without waiting completion of real broadcasting of the program.

It is a second effect of the invention to complete reproduction of a program at almost the same timing as an end time of real broadcasting of the program, even if the reproduction is started a long time behind the starting of the real broadcasting of the program. Thereby, a user can save a great deal of time.

This effect is realized by recording the program into a plurality of recording files and performing time-shift reproduction and fast-forward reproduction about the recording files which has been already recorded.

It is a third effect of the invention that even if external factor, such as sudden power off, to destroy a recording file occurs, contents of the rest of recording files are properly maintained.

This effect is realized by recording a program into a plurality of recording files. That is, an error caused by the external factor influences only on a recording file which a writing operation being performed, and the rest of recording files are not destroyed.

It is a fourth effect of the invention that fast-forward reproduction can perform reproduction of a program more faster speed since the program is recorded into a plurality of recording files in order, and skip operation can be performed for each file.

It is fifth effect of the invention that the system according to the invention can record digital data of a program into a small volume of storage medium since the system is configured to record the digital data into a plurality of recording files and size of each recording files can be designated as required.

It is sixth effect of the invention that space in a storage device can be effectively used since the recording files can be deleted which has been already reproduced and are not required to keep.

What is claimed is:

1. A method of recording/reproducing broadcasting signals, comprising:
    establishing a size of recording files based on a broadcasting time of a program to be recorded and capacity of a storage device in which the recording files are included;
    receiving signals of the program on a channel, and consecutively recording the signals into the recording files in order; and
    controlling to continue the recording step until a recording stop instruction is received or broadcasting of the program is ended.

2. The method of claim 1 further comprising:
    reproducing the recording files in order of recording, in response to a reproduction instruction.

3. The method of claim 1, wherein the recording comprises:
    determining whether or not a volume of a part of the signals which have been recorded into a first recording file reaches the established size;
    closing the first recording file and recording the remaining part of the signals to a second recording file when it is determined that the volume is equal to the size; and
    repeating the determining and the closing/recording to obtain the recording files in which the signals are recorded in order.

4. The method of claim 2, wherein the reproduction instruction is issued after at least one recording file is filled with a part of the signals.

5. The method of claim 2 further comprising:
    deleting a recording file which has reproduced.

6. The method of claim 3 further comprising:
    fast-forward reproducing recording files which complete the recording of the signals in order of recording, in response to a reproduction instruction; and
    reproducing, in normal speed, recording files which complete the recording of the signals after the reproduction instruction.

7. The method of claim 3, wherein when a reproduction instruction is issued, the closing/recording is started.

8. The method of claim 1, wherein each program is broadcast through digital signals and the digital signals are recorded into the corresponding recording file.

9. A recording/reproducing device of broadcasting signals comprising:
    a storage device which includes recording files to record broadcasting signals of a program on a channel;
    an establishing unit which establishes a size of the recording files based on a broadcasting time of the program to be recorded and capacity of the storage device;
    a receive unit which receives signals of the program, and consecutively records the signals into the recording files in order; and a recording control unit which controls the receive unit to repeat the reception and the recording until a recording stop instruction is received or broadcasting of the program is ended.

10. The recording/reproducing device of claim 9 further comprising:

a reproducing control unit which reproduces the recording files in order of recording, in response to a reproduction instruction.

11. The recording/reproducing device of claim 9, wherein the recording control unit determines whether or not a volume of a part of the signals which have been recorded into a first recording file reaches the established size, closes the first recording file and records the remaining part of the signals to a second recording file when it is determined that the volume is equal to the size, and repeats the determination operation and the closing/recording operations to obtain the recording files in which the signals are recorded in order.

12. A method of recording/reproducing broadcasting signals, comprising:

establishing a size of recording files based on a broadcasting time of a program to be recorded and capacity of a storage device in which the recording files are included;

receiving signals of the program on a channel, and consecutively recording the signals into the recording files in order;

controlling to continue the recording step until a recording stop instruction is received or broadcasting of the program is ended; and reproducing the recording files in order of recording, in response to a reproduction instruction, wherein the recording comprises:

determining whether or not a volume of a part of the signals which have been recorded into a first recording file reaches the established size;

closing the first recording file and recording the remaining part of the signals to a second recording file when it is determined that the volume is equal to the size; and repeating the determining and closing/recording to obtain the recording files in which the signals are recorded in order.

13. A recording/reproducing device of broadcasting signals comprising:

a storage device which includes recording files to record broadcasting signals of a program on a channel;

an establishing unit which establishes a size of the recording files based on a broadcasting time of the program to be recorded and capacity of the storage device;

a receive unit which receives signals of the program, and consecutively records the signals into the recording files in order;

a recording control unit which controls the receive unit to repeat the reception and the recording until a recording stop instruction is received or broadcasting of the program is ended; and a reproducing control unit which reproduces the recording files in order of recording, in response to a reproduction instruction, wherein the recording control unit determines whether or not a volume of a part of the signals which have been recorded into a first recording file reaches the established size, closes the first recording file and records the remaining pan of the signals to a second recording file when it is determined that the volume is equal to the size, and repeats the determination operation and the closing/recording operations to obtain the recording files in which the signals are recorded in order.

* * * * *